(No Model.)

W. C. KELLAR & R. R. DITZEL.
GIG TREE.

No. 267,900. Patented Nov. 21, 1882.

Attest.
John W. Lazyman
John C. Trottiger

Inventors.
William C. Kellar
Rudolph R. Ditzel
by James H. Layman
Attorney.

UNITED STATES PATENT OFFICE.

WILLIAM C. KELLAR AND RUDOLPH R. DITZEL, OF CINCINNATI, OHIO.

GIG-TREE.

SPECIFICATION forming part of Letters Patent No. 267,900, dated November 21, 1882.

Application filed June 13, 1882. (No model.)

*To all whom it may concern:*

Be it known that we, WILLIAM C. KELLAR and RUDOLPH R. DITZEL, both citizens of the United States, residing at Cincinnati, in the county of Hamilton and State of Ohio, have invented certain new and useful Improvements in Gig-Trees, of which the following is a specification.

Our invention comprises a novel construction of such gig-trees as are provided with a pair of hinged side flaps, or "jockeys," as they are technically termed; and the improvement consists in the manner of applying the pintles, pivots, or rods to which the jockeys are coupled. These pintles, pivots, or rods are placed in a mold, and a knuckle of the gig-tree is cast around each end of the pintle, thereby leaving the central portion of the latter exposed, in order that the jockey may be united thereto. The hinged part of the jockey is simply bent around said rod to such a distance as to prevent accidental detachment, thereby obviating the expense incident to special drilling and fitting operations, as hereinafter more fully described, and pointed out in the claim.

Figure 1:
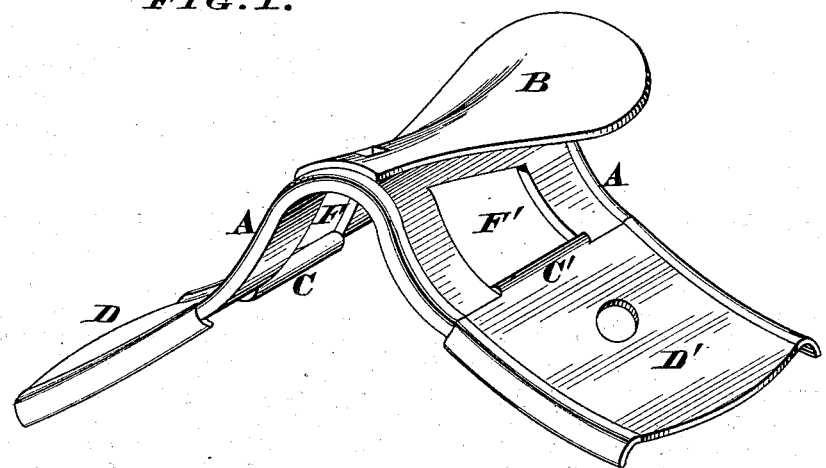
Figure 2:
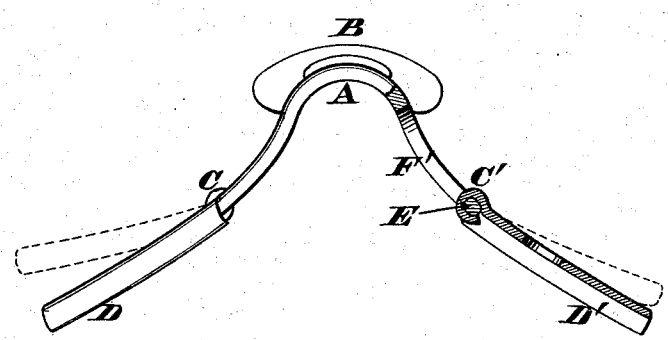
Figure 3:
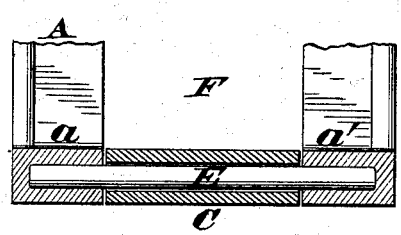

In the annexed drawings, Figure 1 is a perspective view of our improved gig-tree. Fig. 2 is a front elevation of the same, one of the jockeys and a portion of the frame being sectioned. Fig. 3 is an enlarged axial section through one of the hinge-joints wherewith a jockey is coupled to the gig-tree.

A represents an ordinary metallic frame or tree, to which the saddle B is secured in the customary manner. This frame or tree, instead of being a single piece of rigid cast-iron, has hinged to it at C C' a pair of leaves, flaps, extensions, or jockeys, D D', which latter are so constructed as to hold the terret-rings and other customary harness-gear. The manner of hinging or coupling these jockeys to the frame is to place the pintles E in the mold, and then cast the knuckles $a$ $a'$ of the frame around the opposite end of said rod or wire, as seen in Fig. 3. The hinged portions C C' of the jockeys can then be readily bent around the pintles, so as to prevent accidental detachment of said jockeys, while at the same time the latter are free to be turned either up or down, so as to conform to the shape of the animal's back. (See dotted lines in Fig. 2.) Owing to this hinging of the flaps D D' to the frame A, openings F F' are formed in the latter, which openings not only diminish the weight of the tree, but they allow air to circulate through it and keep the animal's back cool, thus preventing sweating. In case the horse should be comparatively broad across the back, the leaves D D' must be opened out or spread accordingly, while a narrower or more angular shape of the back would necessitate a corresponding contraction of said leaves or jockeys; but if the jockeys should not be set exactly at the proper angle, they would soon adjust themselves to a suitable bearing, and thereby prevent any chafing or galling of the animal.

We claim as our invention—

As an improved article of manufacture, the gig-tree A, having knuckles $a$ $a'$ cast around the ends of pintles E, to which latter the jockeys D D' are hinged, in the manner herein described and illustrated.

In testimony whereof we affix our signatures in presence of two witnesses.

WILLIAM C. KELLAR.
    RUDOLPH R. DITZEL.

Witnesses:
 JAMES H. LAYMAN,
 F. R. MCCORMICK.